United States Patent
Rosén et al.

(10) Patent No.: US 12,228,309 B2
(45) Date of Patent: Feb. 18, 2025

(54) HEAT PUMP ASSEMBLY AND CONTROLLING OF THE SAME

(71) Applicant: E.ON SVERIGE AB, Malmo (SE)

(72) Inventors: Per Rosén, Lund (SE); Jacob Skogström, Lomma (SE); Fredrik Rosenqvist, Helsingborg (SE); Bengt Lindoff, Bjarred (SE)

(73) Assignee: E.ON SVERIGE AB, Malmo (SE)

( * ) Notice: Subject to any disclaimer, the term of this patent is extended or adjusted under 35 U.S.C. 154(b) by 680 days.

(21) Appl. No.: 17/310,874

(22) PCT Filed: Feb. 25, 2020

(86) PCT No.: PCT/EP2020/054832
§ 371 (c)(1),
(2) Date: Aug. 27, 2021

(87) PCT Pub. No.: WO2020/178066
PCT Pub. Date: Sep. 10, 2020

(65) Prior Publication Data
US 2022/0146126 A1    May 12, 2022

(30) Foreign Application Priority Data
Mar. 1, 2019    (EP) .................................... 19160200

(51) Int. Cl.
| | |
|---|---|
| F24F 5/00 | (2006.01) |
| F24D 10/00 | (2022.01) |
| F24D 11/02 | (2006.01) |
| F24D 19/10 | (2006.01) |
| F24F 11/84 | (2018.01) |

(52) U.S. Cl.
CPC .......... *F24F 5/0003* (2013.01); *F24D 10/003* (2013.01); *F24D 11/0207* (2013.01); *F24D 19/1015* (2013.01); *F24F 11/84* (2018.01); *F24D 2220/0207* (2013.01); *F24D 2220/0271* (2013.01); *F24F 2221/54* (2013.01)

(58) Field of Classification Search
CPC .............. F24D 19/1015; F24D 10/003; F24D 11/0207; F24D 2220/0271; F24F 5/00; F24F 5/0003
See application file for complete search history.

(56) References Cited

U.S. PATENT DOCUMENTS

| | | | |
|---|---|---|---|
| 11,927,930 B2 * | 3/2024 | Rosén | G05B 19/042 |
| 2012/0279681 A1 | 11/2012 | Vaughan et al. | |

(Continued)

FOREIGN PATENT DOCUMENTS

| | | |
|---|---|---|
| CN | 101776351 A | 7/2010 |
| CN | 104456687 A | 3/2015 |

(Continued)

OTHER PUBLICATIONS

International Search Report and Written Opinion of PCT/EP2020/054832, Dated May 5, 2020 in 8 pages.

*Primary Examiner* — Frantz F Jules
*Assistant Examiner* — Martha Tadesse
(74) *Attorney, Agent, or Firm* — Knobbe, Martens, Olson & Bear, LLP

(57) ABSTRACT

A heat pump assembly (100) is presented. The heat pump assembly (100) comprises a heat pump (110) having a primary side inlet (122) and a primary side outlet (124); a primary side inlet valve assembly (126) comprising: a primary side inlet connection (126a) connected to the primary side inlet (122), a primary side inlet valve first conduit connection (126b) configured to be connected to a first conduit (12) of a thermal energy grid (10), and a primary side inlet valve second conduit connection (126c) configured to be connected to a second conduit (14) of the thermal energy grid (10); a first conduit temperature determining device (105a) configured to measure a local temperature, $t_1$, (Continued)

of heat transfer liquid of the first conduit (12); a second conduit temperature determining device (105$b$) configured to measure a local temperature, $t_2$, of heat transfer liquid of the second conduit (14); and a controller (108). The controller is configured to: receive hand $t_2$ from the first and second conduit temperature determining devices (105$a$; 105$b$), receive information pertaining to whether the heat pump (110) is a heating mode heat pump or a cooling mode heat pump. The controller is configured to upon the heat pump (110) is the heating mode heat pump and upon $t_2 > t_1$ set the primary side inlet valve assembly (126) to fluidly connect the primary side inlet valve first conduit connection (126$b$) and the primary side inlet connection (126$a$), primary side inlet valve assembly (126) to fluidly connect the primary side inlet valve or upon the heat pump (110) is the heating mode heat pump and upon $t_1 > t_2$, set the second conduit connection (126$c$) and the primary side inlet connection (126$a$). The controller is configured to upon the heat pump (110) is the cooling mode heat pump and upon $t_1 > t_2$, set the primary side inlet valve assembly (126) to fluidly connect the primary side inlet valve second conduit connection (126$c$) and the primary side inlet connection (126$a$), or upon the heat pump (110) is the cooling mode heat pump and upon $t_2 > t_1$, set the primary side inlet valve assembly (126) to fluidly connect the primary side inlet valve first conduit connection (126$b$) and the primary side inlet connection (126$a$).

15 Claims, 5 Drawing Sheets

(56) References Cited

U.S. PATENT DOCUMENTS

| | | | | |
|---|---|---|---|---|
| 2014/0277769 | A1* | 9/2014 | Matsuoka | G06Q 50/06 |
| | | | | 700/278 |
| 2020/0096205 | A1* | 3/2020 | Rosén | F24D 18/00 |
| 2021/0293417 | A1* | 9/2021 | Rosenqvist | F24D 10/003 |
| 2022/0026080 | A1* | 1/2022 | Rosén | F24D 10/00 |
| 2022/0243928 | A1* | 8/2022 | Rosén | F24D 10/003 |
| 2023/0213212 | A1* | 7/2023 | Lindoff | F24D 10/00 |
| | | | | 237/8 R |

FOREIGN PATENT DOCUMENTS

| | | | | |
|---|---|---|---|---|
| CN | 108603667 A | | 9/2018 | |
| EP | 3082010 A1 | * | 10/2016 | F24D 19/1006 |
| EP | 3184914 | | 6/2017 | |
| EP | 3296647 | | 3/2018 | |
| EP | 3399246 | | 11/2018 | |
| GB | 2505655 | | 3/2014 | |
| JP | 2004-514870 A | | 5/2004 | |
| JP | 2014-102025 A | | 6/2014 | |
| JP | 2018-112356 A | | 7/2018 | |
| WO | WO 2017/076866 A1 | | 5/2017 | |

* cited by examiner

HEAT PUMP ASSEMBLY AND CONTROLLING OF THE SAME

FIELD OF THE INVENTION

The invention relates to a heat pump assembly. The invention relates to a district thermal energy distribution system comprising such a heat pump assembly. The invention relates to a controller for controlling the heat pump assembly.

BACKGROUND OF THE INVENTION

Nearly all large developed cities in the world have at least two types of energy grids incorporated in their infrastructures; one grid for providing electrical energy and one grid for providing space heating and hot tap water preparation. Today a common grid used for providing space heating and hot tap water preparation is a gas grid providing a burnable gas, typically a fossil fuel gas. The gas provided by the gas grid is locally burned for providing space heating and hot tap water. An alternative for the gas grid for providing space heating and hot tap water preparation is a district heating grid. Also the electrical energy of the electrical energy grid may be used for space heating and hot tap water preparation. Also the electrical energy of the electrical energy grid may be used for space cooling. The electrical energy of the electrical energy grid is further used for driving refrigerators and freezers.

Accordingly, traditional building heating and cooling systems use primary high grade energy sources such as electricity and fossil fuels or an energy source in the form of industrial waste heat to provide space heating and/or cooling, and to heat or cool water used in the building. Furthermore, it has been increasingly common to also install a district cooling grid in cities for space cooling. The process of heating or cooling the building spaces and water converts this high grade energy into low grade waste heat with high entropy which leaves the building and is returned to the environment.

Hence, there is a need for improvements in how to provide heating and cooling to a city.

SUMMARY OF THE INVENTION

It is an object of the present invention to solve at least some of the problems mentioned above.

According to a first aspect a heat pump assembly is provided. The heat pump assembly comprising: a heat pump having a primary side inlet and a primary side outlet; a primary side inlet valve assembly; a first conduit temperature determining device; a second conduit temperature determining device; and a controller. The primary side inlet valve assembly comprises: a primary side inlet connection connected to the primary side inlet, a primary side inlet valve first conduit connection configured to be connected to a first conduit of a thermal energy grid, and a primary side inlet valve second conduit connection configured to be connected to a second conduit of the thermal energy grid. The first conduit temperature determining device is configured to measure a local temperature, $t_1$, of heat transfer liquid of the first conduit. The second conduit temperature determining device is configured to measure a local temperature, $t_2$, of heat transfer liquid of the second conduit. The controller is configured to: receive $t_1$ and $t_2$ from the first and second conduit temperature determining devices; and receive information pertaining to whether the heat pump is a heating mode heat pump or a cooling mode heat pump. The controller is configured to upon the heat pump is the heating mode heat pump and upon $t_1 > t_2$, set the primary side inlet valve assembly to fluidly connect the primary side inlet valve first conduit connection and the primary side inlet connection. The controller is configured to upon the heat pump is the heating mode heat pump and upon $t_2 > t_1$, set the primary side inlet valve assembly to fluidly connect the primary side inlet valve second conduit connection and the primary side inlet connection. The controller is configured to upon the heat pump is the cooling mode heat pump and upon $t_1 > t_2$, set the primary side inlet valve assembly to fluidly connect the primary side inlet valve second conduit connection and the primary side inlet connection. The controller is configured to upon the heat pump is the cooling mode heat pump and upon $t_2 > t_1$, set the primary side inlet valve assembly to fluidly connect the primary side inlet valve first conduit connection and the primary side inlet connection.

The present heat pump assembly is simple to connect to the thermal energy grid being part of a district thermal energy distribution system. The heat pump assembly may provide for the possibility of the heat transfer liquid of first and second conduits of the thermal energy grid to change in temperature. Especially, the heat pump assembly may provide for the possibility of the heat transfer liquid of the first conduit to sometimes be higher than the heat transfer liquid of the second conduit and sometimes vice versa. Further, the heat pump assembly may provide for a failsafe installation. This since no prior knowledge of which one of the first and second conduits that are carrying the warmest heat transfer liquid is need upon installation. The complexity of the installation may be reduced reducing the need for knowledge about the system upon installation. The present heat pump assembly may be used in a modular fashion, this since each and every heat pump assembly may be used for fulfilling heating demands, for fulfilling cooling demands, and for fulfilling heating and cooling demands. For example, a heat pump assembly may initially be used only for fulfilling a heating demand, however, in the future the same heat pump assembly may be used for fulfilling at installation unknown cooling demands in the building wherein the heat pump assembly is installed. Further, the present heat pump assembly may save space in the building, this since the same assembly may be used for fulfilling both heating and cooling demands. Using the same assembly for fulfilling both heating and cooling demands may also save on installation costs and save on the environment. The latter since less amount of refrigerant will be needed in a combined heat pump assembly as the present one as compared with two different dedicated heat pump assemblies, one for fulfilling heating demands and one for fulfilling cooling demands.

The controller may further be configured to upon the heat pump is the heating mode heat pump and upon $t_1 > t_2$, set the primary side inlet valve assembly to fluidly disconnect the primary side inlet valve second conduit connection and the primary side inlet connection.

The controller may further be configured to upon the heat pump is the heating mode heat pump and upon $t_2 > t_1$, set the primary side inlet valve assembly to fluidly disconnect the primary side inlet valve first conduit connection and the primary side inlet connection.

The controller may further be configured to upon the heat pump is the cooling mode heat pump and upon $t_1 > t_2$, set the primary side inlet valve assembly to fluidly disconnect the primary side inlet valve first conduit connection and the primary side inlet connection.

The controller may further be configured to upon the heat pump is the cooling mode heat pump and upon $t_2 > t_1$, set the primary side inlet valve assembly to fluidly disconnect the primary side inlet valve second conduit connection and the primary side inlet connection.

The heat pump assembly may further comprise a primary side outlet valve assembly. The primary side outlet valve assembly may comprise:

a primary side outlet connection connected to the primary side outlet;

a primary side outlet valve first conduit connection configured to be connected to the first conduit of the thermal energy grid; and a primary side outlet valve second conduit connection configured to be connected to the second conduit of the thermal energy grid.

The controller may further be configured to upon the heat pump is the heating mode heat pump and upon $t_1 > t_2$, set the primary side outlet valve assembly to fluidly connect the primary side outlet connection and the primary side outlet valve second conduit connection.

The controller may further be configured to upon the heat pump is the heating mode heat pump and upon $t_2 > t_1$, set the primary side outlet valve assembly to fluidly connect the primary side outlet connection and the primary side outlet valve first conduit connection.

The controller may further be configured to upon the heat pump is the cooling mode heat pump and upon $t_1 > t_2$, set the primary side outlet valve assembly to fluidly connect the primary side outlet connection and the primary side outlet valve first conduit connection.

The controller may further be configured to upon the heat pump is the cooling mode heat pump and upon $t_2 > t_1$, set the primary side outlet valve assembly to fluidly connect the primary side outlet connection and the primary side outlet valve second conduit connection.

The controller may further be configured to upon the heat pump is the heating mode heat pump and upon $t_1 > t_2$, set the primary side outlet valve assembly to fluidly disconnect the primary side outlet connection and the primary side outlet valve first conduit connection.

The controller may further be configured to upon the heat pump is the heating mode heat pump and upon $t_2 > t_1$, set the primary side outlet valve assembly to fluidly disconnect the primary side outlet connection and the primary side outlet valve second conduit connection.

The controller may further be configured to upon the heat pump is the cooling mode heat pump and upon $t_1 > t_2$, set the primary side outlet valve assembly to fluidly disconnect the primary side outlet connection and the primary side outlet valve second conduit connection.

The controller may further be configured to upon the heat pump is the cooling mode heat pump and upon $t_2 > t_1$, set the primary side outlet valve assembly to fluidly disconnect the primary side outlet connection and the primary side outlet valve first conduit connection.

The heat pump may be a reversible heat pump having a primary side and a secondary side. The primary side having the primary side inlet and the primary side outlet allowing heat transfer liquid to flow through the primary side of the reversible heat pump. The secondary side having a secondary side inlet and a secondary side outlet allowing heat transfer liquid to flow through the secondary side of the reversible heat pump. The reversible heat pump may be configured to be selectively set in either a heating mode, wherein the heat pump is configured to transfer heat from the primary side to the secondary side acting as the heating mode heat pump, or in a cooling mode, wherein the heat pump is configured to transfer heat from the secondary side to the primary side acting as the cooling mode heat pump. The controller may further be configured to selectively set the revisable heat pump in either the heating mode or in the cooling mode.

The wording "selectively set in either a heating mode or a cooling mode" should be construed as the reversible heat pump is at one point in time set in the heating mode and at another point in time set in the cooling mode. By this a reversible heat pump assembly is achieved. The reversible heat pump assembly may either be set as a heating mode heat pump assembly or as a cooling mode heat pump assembly. By the reversible heat pump assembly, the same heat pump assembly may be used for delivering both heating and cooling. At one point in time the reversible heat pump assembly may be set in the heating mode and at another point in time the reversible heat pump assembly may be set in the cooling mode. By the present reversible heat pump assembly, the utilization of the heat pump assembly may be increased as compared with a dedicated heating or cooling heat pump assembly. The construction of a heating/cooling system in a building may be simplified since only one single heat pump assembly is needed. Further, the controlling of a heating/cooling system in a building may be simplified since only one single heat pump assembly needs to be controlled. The present reversible heat pump assembly may further provide scalability, assume that a client at first only is interested in heating, at a later point in time the same client may start getting cooling delivered as well from the same heat pump assembly. Hence, no new heat pump assembly needs to be installed at the client.

The heat pump assembly may further comprise a secondary side outlet valve assembly. The secondary side outlet valve assembly comprises: a secondary side outlet connection connected to the secondary side outlet; a heating circuit connection configured to be connected to a heating circuit being configured to allow heat transfer liquid to flow therethrough; and a cooling circuit connection configured to be connected to a cooling circuit being configured to allow heat transfer liquid to flow therethrough.

The controller may further be configured to upon the reversible heat pump is set in the heating mode, set the secondary side outlet valve assembly to fluidly connect the secondary side outlet connection and the heating circuit connection.

The controller may further be configured to upon the reversible heat pump is set in the cooling mode, set the secondary side outlet valve assembly to fluidly connect the secondary side outlet connection and the cooling circuit connection.

The controller may further be configured to upon the reversible heat pump is set in the heating mode, set the secondary side outlet valve assembly to fluidly disconnect the secondary side outlet connection and the cooling circuit connection.

The controller may further be configured to upon the reversible heat pump is set in the cooling mode, set the secondary side outlet valve assembly to fluidly disconnect the secondary side outlet connection and the heating circuit connection.

The reversible heat pump may comprise a primary side coil, a secondary side coil and a reversing valve.

Upon the heat pump is set in the heating mode, the first side coil is configured to work as an evaporator, the second side coil is configured to work as a condenser, and the reversing valve is set such that refrigerant of the heat pump is flowing from the primary side coil to the secondary side coil.

Upon the heat pump is set in the cooling mode, the secondary side coil is configured to work as an evaporator, the primary side coil is configured to work as a condenser, and the reversing valve is set such that refrigerant of the heat pump is flowing from the secondary side coil to the primary side coil.

The heat pump assembly may further comprise: a pressure difference determining device configured to determine a local pressure difference between heat transfer liquid of the first and the second conduits; and a flow controller connected in between the primary side inlet of the heat pump and the primary side inlet valve assembly, wherein the flow controller is configured to be selectively set in either a pumping mode or in a flowing mode, wherein upon set in the pumping mode the flow controller is configured to act as a pump for pumping heat transfer liquid from the thermal energy grid into the primary side inlet of the heat pump, and wherein upon set in flowing mode the flow controller is configured to act as a flow regulator for allowing heat transfer liquid from the thermal energy grid to flow into the primary side inlet of the heat pump. Wherein the controller is further configured to, based on the local pressure difference, selectively control the flow controller to be set in the pumping mode or in the flowing mode. The wording "selectively set the flow controller in either a pumping mode or in a flowing mode" should be construed as the flow controller is at one point in time set in the pumping mode and at another point in time set in the flowing mode.

The wording "pump" should be construed as a device configured to, in a controlled way, allow heat transfer liquid to be pumped through the pump when the pump is in an active pumping state. In the expression "in a controlled way" it is comprised that the pump may regulate the flow rate of the fluid being pumped by the pump.

The wording "flow regulator" should be construed as device configured to, in a controlled way, allow fluid to flow through the flow regulator when the flow regulator is in an active state. Moreover, the flow regulator may also be arranged such that the flow rate of fluid through the flow regulator may be controlled. Hence, the flow regulator may be arranged to regulate the flow of fluid theretrough.

The design of the heat pump assembly allows it to be connected to a thermal energy grid wherein the pressure between heat transfer liquid of the first and second conduits are allowed to vary both spatially and temporally. This since the heat pump assembly comprises the pressure difference determining device, and since it is connected to the first and second conduit via selectively setting the flow controller in the pumping mode or in the flowing mode. Further, the flow controller allows for an efficient flow control of heat transfer liquid between the first and second conduits. Moreover, the flow controller may be made physically compact. Hence, physical space may be saved. Furthermore, the flow controller allows for transfer of heat transfer liquid between the hot and cold conduits in an energy efficient manner.

The heat pump assembly may further comprise: a pressure difference determining device adapted to determine a local pressure difference between heat transfer liquid of the first and the second conduits; a flow regulator connected in between the primary side inlet of the heat pump and the primary side inlet valve assembly, wherein the flow regulator is configured to allow heat transfer liquid from the thermal energy grid to flow into the primary side inlet of the heat pump; and a pump connected in between the primary side inlet of the heat pump and the primary side inlet valve assembly, wherein the pump is configured to pump heat transfer liquid from the thermal energy grid into the primary side inlet of the heat pump. The controller may further be configured to, based on the local pressure difference, selectively activate either the flow regulator or the pump for transferring heat transfer liquid from the thermal energy grid into the primary side inlet of the heat pump.

The design of the heat pump assembly allows it to be connected to a thermal energy grid wherein the pressure between heat transfer liquid of the first and second conduits are allowed to vary both spatially and temporally. This since the heat pump assembly comprises the pressure difference determining devices and since it is selectively connected to the first and second conduit, respectively, via the flow regulator and the pump.

The controller may further be configured to base the setting of the flow controller in the pumping mode or the flowing mode on if the heat pump is the heating mode heat pump or the cooling mode heat pump.

According to a second aspect a district thermal energy distribution system is provided. The district thermal energy distribution system comprises a thermal energy grid comprising a first conduit configured to allow heat transfer liquid of a first temperature to flow therethrough, and a second conduit configured to allow heat transfer liquid of a second temperature to flow therethrough; and a heat pump assembly according to the first aspect, wherein the heat pump assembly is connected to the thermal energy grid.

The district thermal energy distribution system according may further comprise a plurality of heat pump assemblies according to the first aspect. Each heat pump assembly may further be connected to one or more heating circuits and/or one or more cooling circuits.

The above mentioned features of the heat pump assembly, when applicable, apply to this second aspect as well. In order to avoid undue repetition, reference is made to the above.

The basic idea of the district thermal energy distribution system is based on the insight by the inventors that modern day cities by themselves provide thermal energy that may be reused within the city. The reused thermal energy may be picked up by the district thermal energy distribution system and be used for e.g. space heating or hot tap water preparation. Moreover, increasing demand for space cooling will also be handled within the district thermal energy distribution system. Within the district thermal energy distribution system buildings within the city are interconnected and may in an easy and simple way redistribute low temperature waste energy for different local demands. Amongst other the district thermal energy distribution system will provide for:

Minimizing the use of primary energy due to optimal re-use of energy flows inside the city.

Limiting the need for chimneys or firing places inside the city, since the need for locally burning gas or other fuels will be reduced.

Limiting the need for cooling towers or cooling convectors inside the city, since excess heat produced by cooling devices may be transported away and reused within the district thermal energy distribution system.

Hence, the district thermal energy distribution system provides for a smart duel use of thermal energy within a city. When integrated into a city the district thermal energy distribution system makes use of low level thermal energy waste in both heating and cooling applications within the city. This will reduce the primary energy consumption of a city by eliminating the need for a gas grid or a district heating grid and a cooling grid in city.

According to a third aspect a controller is presented. The controller is configured to control a primary side inlet valve assembly comprising a primary side inlet connection connected to a primary side inlet of a heat pump, a primary side inlet valve first conduit connection connected to a first conduit of a thermal energy grid, and a primary side inlet valve second conduit connection connected to a second conduit of the thermal energy grid. The controller is configured to: receive a local temperature, $t_1$, of heat transfer liquid of the first conduit; receive a local temperature, $t_2$, of heat transfer liquid of the second conduit; receive information pertaining to whether the heat pump is a heating mode heat pump or a cooling mode heat pump. The controller is further configured to upon the heat pump is the heating mode heat pump and upon $t_1 > t_2$, set the primary side inlet valve assembly to fluidly connect the primary side inlet valve first conduit connection and the primary side inlet connection. The controller is further configured to upon the heat pump is the heating mode heat pump and upon $t_2 > t_1$, set the primary side inlet valve assembly to fluidly connect the primary side inlet valve second conduit connection and the primary side inlet connection. The controller is further configured to upon the heat pump is the cooling mode heat pump and upon $t_1 > t_2$, set the primary side inlet valve assembly to fluidly connect the primary side inlet valve second conduit connection and the primary side inlet connection. The controller is further configured to upon the heat pump is the cooling mode heat pump and upon $t_2 > t_1$, set the primary side inlet valve assembly to fluidly connect the primary side inlet valve first conduit connection and the primary side inlet connection.

The above mentioned features of the heat pump assembly and or the district thermal energy distribution system, when applicable, apply to this third aspect as well. In order to avoid undue repetition, reference is made to the above.

According to a fourth aspect a method for controlling a primary side inlet valve assembly comprising a primary side inlet connection connected to a primary side inlet of a heat pump, a primary side inlet valve first conduit connection connected to a first conduit of a thermal energy grid, and a primary side inlet valve second conduit connection connected to a second conduit of the thermal energy grid is presented. The method comprising: determining a local temperature, $t_1$, of heat transfer liquid of the first conduit; determining a local temperature, $t_2$, of heat transfer liquid of the second conduit; receiving information pertaining to whether the heat pump is a heating mode heat pump or a cooling mode heat pump; and comparing $t_1$ and $t_2$. The method further comprises: upon the heat pump is the heating mode heat pump and upon $t_1 > t_2$, setting the primary side inlet valve assembly to fluidly connect the primary side inlet valve first conduit connection and the primary side inlet connection; upon the heat pump is the heating mode heat pump and upon $t_2 > t_1$, setting the primary side inlet valve assembly to fluidly connect the primary side inlet valve second conduit connection and the primary side inlet connection; upon the heat pump is the cooling mode heat pump and upon $t_1 > t_2$, setting the primary side inlet valve assembly to fluidly connect the primary side inlet valve second conduit connection and the primary side inlet connection; or upon the heat pump is the cooling mode heat pump and upon $t_2 > t_1$, set the primary side inlet valve assembly to fluidly connect the primary side inlet valve first conduit connection and the primary side inlet connection.

The above mentioned features of the heat pump assembly and or the district thermal energy distribution system, when applicable, apply to this fourth aspect as well. In order to avoid undue repetition, reference is made to the above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

These and other aspects of the present invention will now be described in more detail, with reference to the appended drawings showing embodiments of the invention. The figures are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
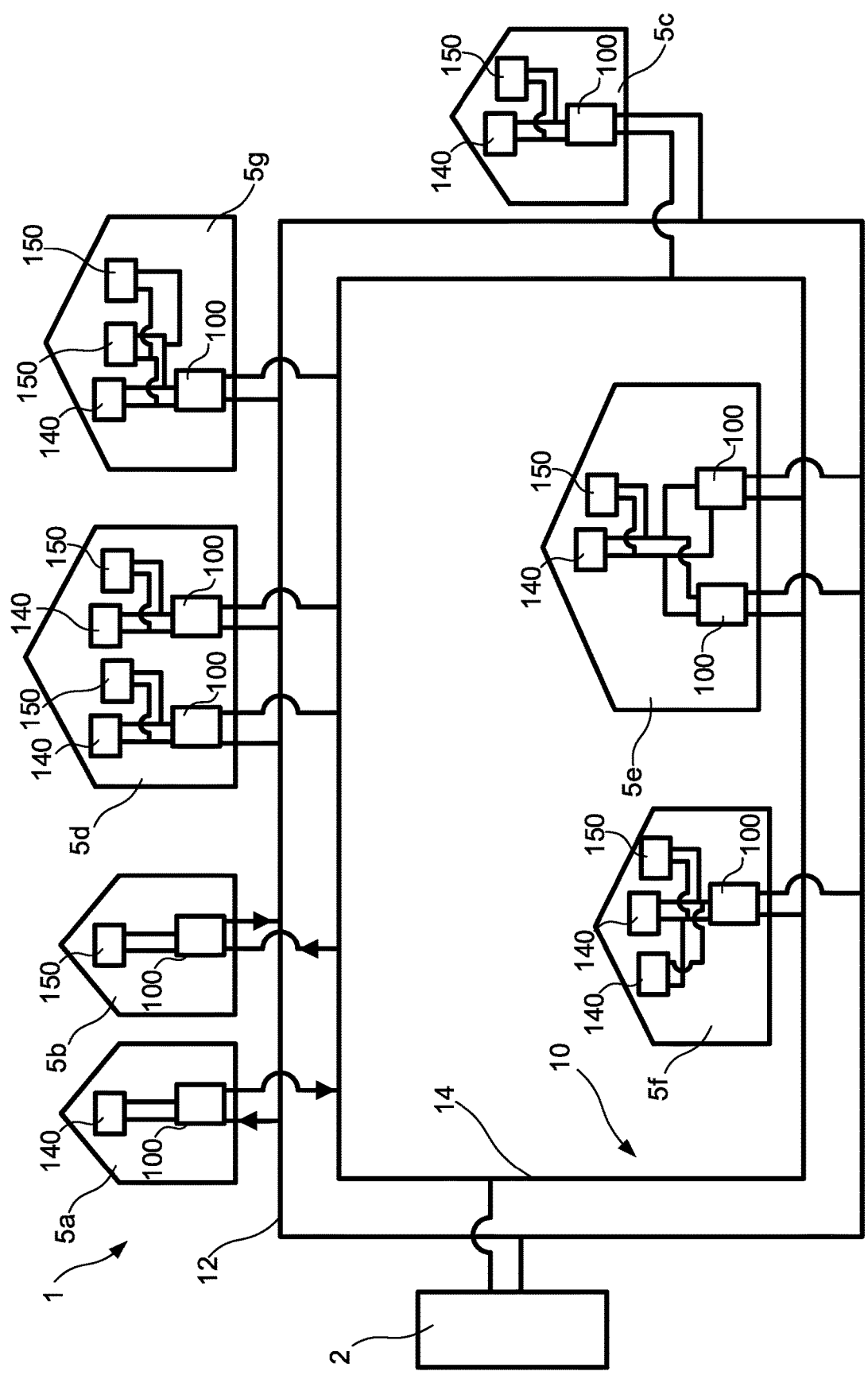
FIG. 1 is a schematic diagram of a district thermal energy distribution system.

In FIG. 1 a district thermal energy distribution system 1 is illustrated. The district thermal energy distribution system 1 comprises a thermal energy grid 10 and a plurality of buildings 5. The thermal energy grid 10 is configured to interconnect the buildings 5 such that thermal energy in the form of heating and/or cooling may be distributed to and/or from the buildings 5. Hence, the thermal energy grid 10 may be seen as a district thermal energy grid. The plurality of buildings 5 are thermally coupled to the thermal energy grid 10. The thermal energy grid 10 is arranged to circulate and store thermal energy in heat transfer liquid flowing through the thermal energy grid 10.

The heat transfer liquid of the thermal energy grid 10 may comprise water. However, other heat transfer liquids may alternatively be used. Some non-limiting examples are ammonia, oils, alcohols and anti-freezing liquids, such as glycol. The heat transfer liquid may also comprise a mixture of two or more of the heat transfer liquids mentioned above. A specific mixture to be used is water mixed with an anti-freezing liquid.

The thermal energy grid 10 comprises two conduits 12, 14 for allowing flow of heat transfer liquid therethrough. The temperature of the heat transfer liquid of the two conduits 12, 14 is set to be different. A first conduit 12 in the thermal energy grid 10 is configured to allow heat transfer liquid of a first temperature to flow therethrough. A second conduit 14 in the thermal energy grid 10 is configured to allow heat transfer liquid of a second temperature to flow therethrough. The second temperature is different than the first temperature.

In case heat transfer liquid is water (possibly with added anti-freezing liquid), a suitable temperature range for the hot heat transfer liquid is between 0 and 45° C. A suitable temperature difference between the first and second temperatures is in the range of 5-16° C., preferably in the range of 7-12° C., more preferably 8-10° C.

Preferably, the system is set to operate with a sliding temperature difference which varies depending on the climate. Preferably, the sliding temperature difference is fixed. Hence, the temperature difference may be set to momentarily slide with a fixed temperature difference.

The thermal energy grid 10 may be configured so that for periods of time the temperature of the heat transfer liquid in the first conduit 12 is higher than the temperature of the heat transfer liquid in the second conduit 14 and for other periods of time the temperature of the heat transfer liquid in the first conduit 12 is lower than the temperature of the heat transfer liquid in the second conduit 14. Hence, sometimes the first conduit 12 may carry the warmest heat transfer liquid and sometimes the cold conduit 14 may carry the warmest heat transfer liquid. The change in which conduit of the two conduits 12, 14 that is carrying the warmest heat transfer liquid may be set to vary depending on the season during a year. According to one example, in case the first conduit 12 is better insulated than the second conduit 14, during summer season the first conduit 12 may be configured to carry the colder heat transfer liquid and during winter season the first conduit 12 may be configured to carry the warmer heat transfer liquid. During winter season the climate is colder than during the summer season.

The first conduit 12 and the second conduit 14 are separate. The first conduit 12 and the second conduit 14 may be parallelly arranged. The first conduit 12 and the second conduit 14 may be arranged as closed loops of piping. Alternatively, the first conduit 12 and the second conduit 14 may be arranged as open loop of piping. The first conduit 12 and the second conduit 14 are fluidly interconnected at the buildings 5 for allowing of thermal energy transfer to and from the buildings 5. This will be discussed more in detail further below.

The two conduits 12, 14 of the thermal energy grid 10 may be formed by plastic, composite, concrete, or metal pipes. According to one embodiment High Density Polyethylene (HDPE) pipes may be used. The pipes may be single wall pipes.

One or both of the pipes forming the two conduits 12, 14 may be uninsulated. One or both of the pipes forming the two conduits 12, 14 may be insulated. Hence, the first and second conduits 12, 14 may be differently insulated. The insulation may be formed by wrapping the one or both of the pipes with insulation collar. Alternatively, or in combination, the insulation may be formed by filling material surrounding the first and second conduits 12, 14 in ground. Accordingly, the thermal energy grid 10 may be arranged in the ground. The ground will be used as thermal inertia of the thermal energy grid 10. The filling material surrounding the first conduit 12 may be different from the filling material surrounding the second conduit 14. The two different filling materials may have different insulation properties. The first and second conduits 12, 14 may be arranged differently deep into the ground. This may add the effect that the thermal inertia outside the respective conduit may be different.

According to one embodiment the two conduits 12, 14 of the thermal energy grid 10 are dimensioned for pressures up to 1 MPa (10 bar). According to other embodiments the two conduits 12, 14 of the thermal energy grid 10 may be dimensioned for pressures up to 0.6 MPa (6 bar) or for pressures up to 1.6 MPa (16 bar).

The district thermal energy distribution system 1 may comprise a thermal server plant 2. The thermal server plant 2 functions as an external thermal source and/or thermal sink. A function of the thermal server plant 2 may be to maintain the temperature difference between the first and second conduits 12, 14 of the thermal energy grid 10. That is, the thermal server plant 2 may be used for balancing the district thermal energy distribution system 1 such that when the thermal energy grid 10 reaches a temperature end point the thermal server plant 2 is arranged to inhale or exhale thermal energy to/from the thermal energy grid 10. In winter time, when there is higher probability that the warm one of the first and second conduits 12, 14 reaches its' lowest temperature end point, the thermal server plant 2 may be used for adding thermal energy to the thermal energy grid 10. In summer time, when there is higher probability that the cold one of the first and second conduits 12, 14 reaches its' highest temperature end point, the thermal server plant 2 may be used to subtract thermal energy from the thermal energy grid 10.

Further, the thermal server plant 2 or any other suitable device of the district thermal energy distribution system 1 may be used for determining and controlling which one of the first and second conduits 12, 14 is to be set to be the warm one of the first and second conduits 12, 14 and which one of the first and second conduits 12, 14 is to be set to be the cold one of the first and second conduits 12, 14. As mentioned above, for some periods of time the first conduit 12 may be set to be the warm one of the first and second conduits 12, 14 and for some other periods of time the second conduit 14 may be set to be the warm one of the first and second conduits 12, 14.

A building 5 comprises at least one heat pump assembly 100. One specific building 5 may comprise more than one heat pump assembly 100. Each heat pump assembly 100 is configured to be connected to the thermal energy grid 10.

A specific heat pump assembly 100 may be configured to extract heat from the thermal energy grid 10 and deposit the extracted heat in a heating circuit 140 connected to the specific heat pump assembly 100. Such a specific heat pump assembly 100 will be referred to as a heating mode heat pump assembly. The heating circuit 140 may be a local heating circuit configured within a building 5. The heating circuit 140 is configured to allow heat transfer liquid to flow therethrough. The heating circuit 140 may be one or more of a comfort heating system, a process heating system, and hot tap water production system. The heating mode heat pump assembly is acting as a thermal sink. Hence, the heating mode heat pump assembly is configured to remove thermal energy from the thermal energy grid 10. Or in other words, the heating mode heat pump assembly is configured to transfer thermal energy from heat transfer liquid of the thermal energy grid 10 to heat transfer liquid of the heating circuit 140. This is achieved by transfer of thermal energy from heat transfer liquid taken from the warm one of the first and second conduits 12, 14 to heat transfer liquid of the heating circuit 140, such that heat transfer liquid returned to the cold one of the first and second conduits 12, 14 has a temperature lower than the temperature of the heat transfer liquid of the warm one of the first and second conduits 12, 14. Preferably, the temperature of heat transfer liquid returned to the cold one of the first and second conduits 12, 14 equals the temperature of the heat transfer liquid already present in the cold one of the first and second conduits 12, 14. Hence, a heating mode heat pump assembly 100 may be installed in a building 5 for acting as a provider for heat to one or more local heating circuits 140. As a non-limiting example, a local heating circuit 140 may be arranged to deliver space heating, process heating or hot tap hot water preparation. Alternatively, or in combination, the local heating circuit 140 may deliver pool heating or ice- and snow purging. Hence, the heating mode heat pump assembly 100 is configured to derive heat from heat transfer liquid of the warm one of the first and second conduits 12, 14 and to create a cooled heat transfer liquid flow into the cold one of the first and second conduits 12, 14. Hence, the heating mode heat pump assembly 100 fluidly interconnects the first and second conduits 12, 14 such that hot heat transfer liquid can flow from the hot one of the first and second conduits 12, 14 through the heating mode heat pump assembly and then into the cold one of the first and second conduits 12, 14 after thermal energy in the heat transfer liquid has been consumed by the heating mode heat pump assembly. A specific heating mode heat pump assembly 100 may be connected to one or more heating circuits 140. A heating mode heat pump assembly 100 connected to a heating circuit 140 is illustrated in building 5a of FIG. 1. In the district thermal energy distribution system 1 illustrated in FIG. 1 the first conduit 12 is the hot one of the first and second conduits 12, 14.

Alternatively, a specific heat pump assembly 100 may be configured to extract heat from its surroundings, via a cooling circuit 150 connected to the specific heat pump assembly 100 and deposit the extracted heat in the thermal energy grid 10. Such a specific heat pump assembly 100 will be referred to as a cooling mode heat pump assembly. The cooling circuit 140 may be a local cooling circuit configured within a building 5. The cooling circuit 150 is configured to allow heat transfer liquid to flow therethrough. The cooling circuit 150 may be one or more of a comfort cooling system, a process cooling system, a refrigeration system, and a freezing system. The cooling mode heat pump assembly is acting as a thermal source. Hence, the cooling mode heat pump assembly is arranged to deposit thermal energy to the thermal energy grid 10. Or in other words, the cooling mode heat pump assembly 100 is arranged to transfer thermal energy from heat transfer liquid of the cooling circuit 150 to heat transfer liquid of the thermal energy grid 10. This is achieved by transfer of thermal energy from heat transfer liquid of the cooling circuit 150 to heat transfer liquid taken from the cold one of the first and second conduits 12, 14, such that heat transfer liquid returned to the hot one of the first and second conduits 12, 14 has a temperature higher than the temperature of heat transfer liquid in the cold one of the first and second conduits 12, 14. Preferably, the temperature of the heat transfer liquid returned to the hot one of the first and second conduits 12, 14 equals the temperature of the heat transfer liquid already present in the hot one of the first and second conduits 12, 14. Hence, a cooling mode heat pump assembly may be installed in a building 5 for acting as a provider for cooling to one or more local cooling circuits 150. As a non-limiting example a local cooling circuit 150 may be arranged to deliver space cooling, process cooling or cooling for freezers and refrigerators. Alternatively, or in combination, the local cooler may deliver cooling for ice rinks and ski centers or ice- and snow making. Hence, the cooling mode heat pump assembly 100 is configured to derive cooling from heat transfer liquid of the cold one of the first and second conduits 12, 14 and to create a heated heat transfer liquid flow into the hot one of the first and second conduits 12, 14. Hence, the cooling mode heat pump assembly fluidly interconnects the first and second conduits 14, 12 such that cold heat transfer liquid can flow from the cold one of the first and second conduits 12, 14 through the cooling mode heat pump assembly and then into the hot one of the first and second conduits 12, 14 after thermal energy has been deposited into the heat transfer liquid by the cooling mode heat pump assembly. A specific cooling mode heat pump assembly 100 may be connected to one or more cooling circuits 150. A cooling mode heat pump assembly 100 connected to a cooling circuit 150 is illustrated in building 5b of FIG. 1. In the district thermal energy distribution system 1 illustrated in FIG. 1 the first conduit 12 is the hot one of the first and second conduits 12, 14.

Alternatively, a specific heat pump assembly 100 may be configured to be selectively set to be either a heating mode heat pump assembly or a cooling mode heat pump assembly. Hence, a specific heat pump assembly 100 may be configured to either extract heat from the thermal energy grid 10 and deposit the extracted heat in a heating circuit 140 connected to the specific heat pump assembly 100, or extract heat from its surroundings, via a cooling circuit 150 connected to the specific heat pump assembly 100 and deposit the extracted heat in the thermal energy grid 10. Such a specific heat pump assembly 100 will be referred to as a reversible heat pump assembly 100. This since it may be set to operate in either as a heating mode heat pump assembly or a cooling mode a heat pump assembly. How to selectively set the reversible heat pump assembly 100 as either a heating mode heat pump assembly or a cooling mode heat pump assembly will be discussed in further detail below in connection with FIG. 4.

A specific reversible heat pump assembly 100 may be connected to one heating circuit 140 and to one cooling circuit 150. This is e.g. illustrated in building 5c of FIG. 1. A building may comprise a plurality of reversible heat pump assemblies 100 each being connected to one heating circuit 140 and to one cooling circuit 150. This is e.g. illustrated in buildings 5d of FIG. 1. Moreover, a plurality of reversible heat pump assemblies 100 may be connected to one heating circuit 140 and to one cooling circuit 150. This is e.g. illustrated in building 5e of FIG. 1. If so, one of the plurality of reversible heat pump assemblies 100 may be set in the heating mode for providing heating to the one heating circuit 140 and the another one of the plurality of reversible heat pump assemblies 100 may be set in the cooling mode for providing cooling to the one cooling circuit 150. Alternatively, two or more of the plurality of reversible heat pump assemblies 100 may be set in the heating mode for providing heating to the one heating circuit 140. Yet alternatively, two or more of the plurality of reversible heat pump assemblies 100 may be set in the cooling mode for providing cooling to the one cooling circuit 150. Further alternatively, all of the plurality of reversible heat pump assemblies 100 may be set in the heating mode for providing heating to the one heating circuit 140. Alternatively, all of the plurality of reversible heat pump assemblies 100 may be set in the cooling mode for providing cooling to the one cooling circuit 150. At a first specific point in time one of the alternative settings of the plurality of reversible heat pump assemblies 100 indicated above may be used, at another specific point in time another one of the alternative settings of the plurality of reversible heat pump assemblies 100 indicated above may be used. Hence, depending of the heating and cooling needs of the heating circuit 140 and the cooling circuit 150 the plurality of reversible heat pump assemblies 100 may be set differently. Further, a specific reversible heat pump assembly 100 may be connected to a plurality of heating circuits 140. This is e.g. illustrated in buildings 5f of FIG. 1. If so, the reversible heat pump assembly 100 may be configured to deliver heat to one of the plurality of heating circuits 140 at a first point in time and to another one of the heating circuits 140 at second point in time, the second point in time being different from the first point in time. Furthermore, a specific reversible heat pump assembly 100 may be connected to a plurality of cooling circuits 150. This is e.g. illustrated in buildings 5g of FIG. 1. If so, the reversible heat pump assembly 100 may be configured to deliver cooling to one of the plurality of cooling circuits 150 at a first point in time and to another one of the cooling circuits 150 at second point in time, the second point in time being different from the first point in time.

Heating Mode Heat Pump Assembly

Figure 2:
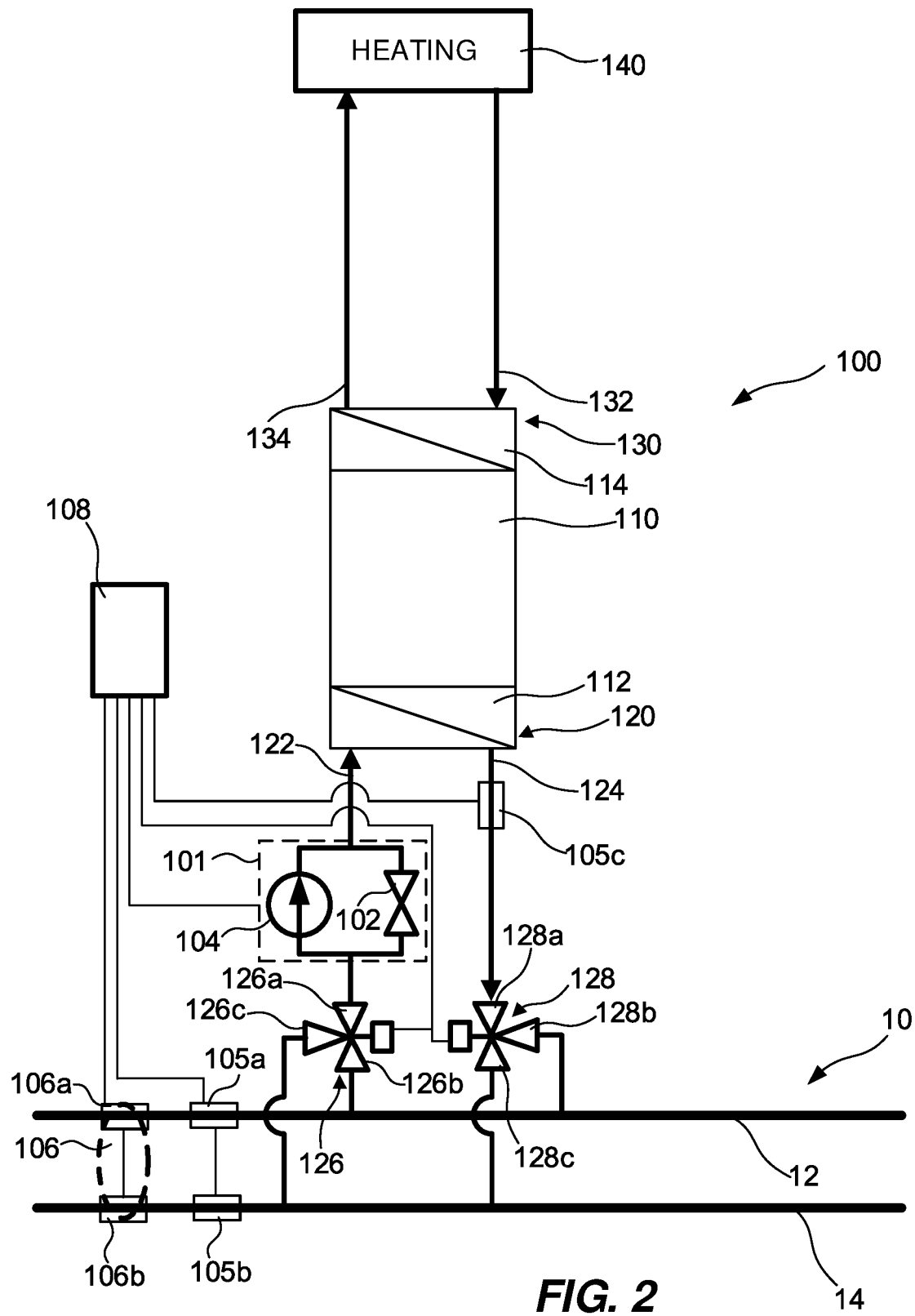
FIG. 2 is a schematic diagram of a heating mode heat pump assembly connected to a thermal energy grid and to a heating circuit.

With reference to FIG. 2 the heating mode heat pump assembly 100 will now be discussed. The heating mode heat pump assembly 100 comprises a heat pump 110, a primary side inlet valve assembly 126, and a primary side outlet valve assembly 128.

The heat pump 110 comprises a primary side 120 and a secondary side 130. The primary side 120 of the heat pump 110 comprises a primary side inlet 122 and a primary side outlet 124 allowing heat transfer liquid to flow through the first side 120 of the heat pump 110. Hence, the heat pump 110 is configured such that heat transfer liquid of the thermal energy grid 10 is allowed flow through the first side 120 of the heat pump 110 via the first side inlet 122 and the first side outlet 124. The secondary side 130 of the heat pump 110 comprises a secondary side inlet 132 and a secondary side outlet 134 allowing heat transfer liquid to flow through the secondary side 130 of the heat pump 110. Hence, the heat pump 110 is configured such that heat transfer liquid of the heating circuit 140 is allowed flow through the secondary side 130 of the heat pump 110 via the secondary side inlet 132 and the secondary side outlet 134. In the heating mode heat pump assembly 100 the heat pump 110 is configured to transfer heat from the primary side 120 to the secondary side 130. The heat pump comprises a primary side coil 112 and a secondary side coil 114. For the heating mode heat pump assembly 100 the primary side coil 112 is configured to work as an evaporator and the secondary side coil 114 is configured to work as a condenser. Refrigerant of the heat pump 110 is flowing from the primary side coil 112 to the secondary side coil 114. Hence, the refrigerant flowing from the primary side coil 112 (acting as an evaporator) carries thermal energy from thermal energy grid 10 to the secondary side 130 of the heat pump 110. Vapor temperature is augmented within the heat pump 110 by compressing it. The secondary side coil 114 (acting as a condenser) then transfers thermal energy (including energy from the compression) to the secondary side 130 of the heat pump 110. The transferred heat will heat heat transfer liquid of the heating circuit 140. The refrigerant is then allowed to expand, and hence cool, and absorb heat from the thermal energy grid 10 in the primary side coil 112 (acting as an evaporator), and the cycle repeats.

The primary side inlet valve assembly 126 comprises a primary side inlet connection 126a connected to the primary side inlet 122, a primary side inlet valve first conduit connection 126b configured to be connected to a first conduit 12 of a thermal energy grid 10, and a primary side inlet valve second conduit connection 126c configured to be connected to a second conduit 14 of the thermal energy grid 10. All the connections 126a-c of the primary side inlet valve assembly 126 are configured to fluidly connect the primary side inlet valve assembly 126 to the respective device/conduit. Any such connection may be made using piping. Hence, the primary side inlet conn 126a is configured to fluidly connect the primary side inlet valve assembly 126 with the primary side inlet 122 of the heat pump 110. The primary side inlet valve first conduit connection 126b is arranged to fluidly connect the primary side inlet valve assembly 126 with the first conduit 12 of the thermal energy grid 10. The primary side inlet valve second conduit connection 126c is arranged to fluidly connect the primary side inlet valve assembly 126 with the second conduit 14 of the thermal energy grid 10.

The primary side outlet valve assembly 128 comprises a primary side outlet connection 128a connected to the primary side outlet 124, a primary side outlet valve first conduit connection 128b configured to be connected to the first conduit 12 of the thermal energy grid 10, and a primary side outlet valve second conduit connection 128c configured to be connected to the second conduit 14 of the thermal energy grid 10. All the connections 128a-c of the primary side outlet valve assembly 128 are configured to fluidly connect the primary side outlet valve assembly 128 to the respective device/conduit. Any such connection may be made using piping. Hence, the primary side outlet connection 128a is configured to fluidly connect the primary side outlet valve assembly 128 with the primary side outlet 124 of the heat pump 110. The primary side outlet valve first conduit connection 128b is configured to fluidly connect the primary side outlet valve assembly 128 with the first conduit 12 of the thermal energy grid 10. The primary side outlet valve second conduit connection 128c is configured to fluidly connect the primary side outlet valve assembly 128 with the second conduit 14 of the thermal energy grid 10.

The heating mode heat pump assembly 100 further comprises a first conduit temperature determining device 105a and a second conduit temperature determining device 105b. The first conduit temperature determining device 105a is configured to be connected to the first conduit 12. That is, arranged in the first conduit 12. Alternatively, the first conduit temperature determining device 105a may be arranged in the piping connecting the primary side inlet valve assembly 126 and/or the primary side outlet valve assembly 128 to the first conduit 12. The first conduit temperature determining device 105a is configured to measure a local temperature, $t_1$, of heat transfer liquid of the first conduit 12. The second conduit temperature determining device 105b is configured to be connected to the second conduit 14. That is, arranged in the second conduit 14. Alternatively, the second conduit temperature determining device 105b may be arranged in the piping connecting the primary side inlet valve assembly 126 and/or the primary side outlet valve assembly 128 to the second conduit 14. The second conduit temperature determining device 105b is configured to measure a local temperature, $t_2$, of the heat transfer liquid of the second conduit 14. The first conduit temperature determining device 105a and the second conduit temperature determining device 105b are connected to a controller 108 comprised in the heating mode heat pump assembly 100 for communicating $t_1$ and $t_2$ to the controller 108. $t_1$ and $t_2$ are preferably measured in the vicinity to where the heat pump assembly 100 is connected to the thermal energy grid 10.

The controller 108 is typically software implemented. However, the controller 108 may be a combined hardware and software implementation. The software portions of the controller 108 may be run on a processing unit.

The controller 108 is configured to receive information pertaining to whether the heat pump 110 is heat pump of a heating mode heat pump assembly 100 or a heat pump 110 of a cooling mode heat pump assembly 100. Hence, the controller 108 is configured to receive information pertaining to whether the heat pump 110 is a heating mode heat pump or a cooling mode heat pump. A heating mode heat pump is configured to transfer heat from the primary side 120 to the secondary side 130. A cooling mode heat pump is configured to transfer heat from the secondary side 130 to the primary side 120. The information pertaining to whether the heat pump 110 is a heating mode heat pump or a cooling mode heat pump may be received by presetting the controller 108. Alternatively, or in combination the controller 108 may receive the information from the heat pump 110 itself or from any other device of the heat pump assembly 100.

The controller 108 is connected to the primary side inlet valve assembly 126. The controller 108 is configured to send a control signal to the primary side inlet valve assembly 126. The controller 108 is connected to the primary side outlet valve assembly 128. The controller 108 is configured to send a control signal to the primary side outlet valve assembly 128.

Upon the heat pump assembly 100 is a heating mode heat pump assembly and upon $t_1 > t_2$, the controller 108 is configured to set the primary side inlet valve assembly 126 to fluidly connect the primary side inlet valve first conduit connection 126b and the primary side inlet connection 126a. Further, upon the heat pump assembly 100 is a heating mode heat pump assembly and upon $t_1 > t_2$, the controller 108 is configured to set the primary side inlet valve assembly 126 to fluidly disconnect the primary side inlet valve second conduit connection 126c and the primary side inlet connection 126a.

Moreover, upon the heat pump assembly 100 is a heating mode heat pump assembly and upon $t_1 > t_2$, the controller 108 is configured to set the primary side outlet valve assembly 128 to fluidly connect the primary side outlet connection 128a and the primary side outlet valve second conduit connection 128c. Further, upon the heat pump assembly 100 is a heating mode heat pump assembly and upon $t_1 > t_2$, the controller 108 is configured to set the primary side outlet valve assembly 128 to fluidly disconnect the primary side outlet connection 128a and the primary side outlet valve first conduit connection 128b.

Upon the heat pump assembly 100 is a heating mode heat pump assembly and upon $t_2 > t_1$, the controller 108 is configured to set the primary side inlet valve assembly 126 to fluidly connect the primary side inlet valve second conduit connection 126c and the primary side inlet connection 126a. Further, upon the heat pump assembly 100 is a heating mode heat pump assembly and upon $t_2 > t_1$, the controller 108 is configured to set the primary side inlet valve assembly 126 to fluidly disconnect the primary side inlet valve first conduit connection 126b and the primary side inlet connection 126a.

Moreover, upon the heat pump assembly 100 is a heating mode heat pump assembly and upon $t_2 > t_1$, the controller 108 is configured to set the primary side outlet valve assembly 128 to fluidly connect the primary side outlet connection 128a and the primary side outlet valve first conduit connection 128b. Further, upon the heat pump assembly 100 is a heating mode heat pump assembly and upon $t_2 > t_1$, the controller 108 is configured to set the primary side outlet valve assembly 128 to fluidly disconnect the primary side outlet connection 128a and the primary side outlet valve second conduit connection 128c.

Cooling Mode Heat Pump Assembly

Figure 3:
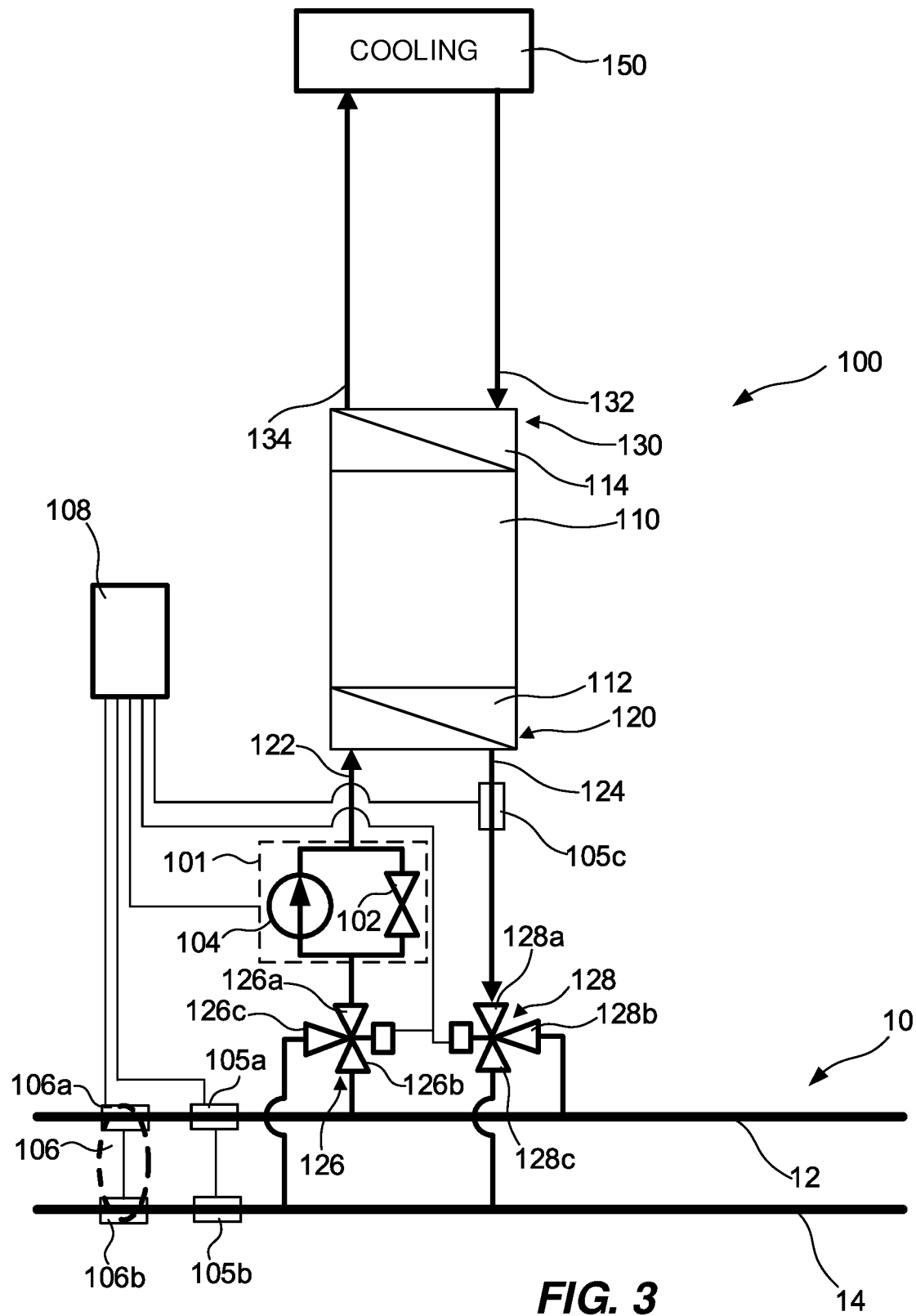
FIG. 3 is a schematic diagram of a cooling mode heat pump assembly connected to a thermal energy grid and to a cooling circuit.

With reference to FIG. 3 the cooling mode heat pump assembly 100 will now be discussed. The cooling mode heat pump assembly 100 comprises similar components as the heating mode heat pump assembly 100 discussed in connection with FIG. 2. Hence, the cooling mode heat pump assembly 100 comprises a heat pump 110, a primary side inlet valve assembly 126, a primary side outlet valve assembly 128, a first conduit temperature determining device 105a, a second conduit temperature determining device 105b, and a controller 108. In order to avoid undue repetition, reference is made to the above for the structural features of the heat pump 110, the primary side inlet valve assembly 126, the primary side outlet valve assembly 128, the first conduit temperature determining device 105a, the second conduit temperature determining device 105b, and the controller 108 of the cooling mode heat pump assembly 100. However, some of the components of the cooling mode heat pump assembly 100 is configured to work differently than the same component of the heating mode heat pump assembly 100. This will now be discussed.

The cooling mode heat pump assembly 100 is, on the secondary side 130 of the heat pump 110, configured to be connected to a cooling circuit 150. The cooling circuit 150 may form part of a comfort cooling system and/or a process cooling system. In the cooling mode heat pump assembly 100, the heat pump 110 is configured such that heat transfer liquid of the cooling circuit 150 is allowed flow through the second side 130 of the heat pump 110 via the second side inlet 132 and the second side outlet 134. In the cooling mode heat pump assembly 100 the heat pump 110 is configured to transfer heat from the secondary side 130 to the primary side 120. The secondary side coil 114 is configured to work as an evaporator and the primary side coil 112 is configured to work as a condenser. Refrigerant of the heat pump 110 is flowing from the secondary side coil 114 to the primary side coil 112. Hence, for the cooling mode heat pump assembly 100 the cycle in the heat pump 110 is similar to what was discussed above in connection with the heating mode heat pump assembly 100, but the primary side coil 112 is now the condenser and the secondary side coil 114 is the evaporator.

Further, the controller 108 is differently configured for the cooling mode heat pump assembly 100.

Upon the heat pump assembly 100 is the cooling mode heat pump assembly and upon $t_1 > t_2$, the controller 108 is configured to set the primary side inlet valve assembly 126 to fluidly connect the primary side inlet valve second conduit connection 126c and the primary side inlet connection 126a. Further, upon the heat pump assembly 100 is a heating mode heat pump assembly and upon $t_1 > t_2$, the controller 108 is configured to set the primary side inlet valve assembly 126 to fluidly disconnect the primary side inlet valve first conduit connection 126b and the primary side inlet connection 126a.

Moreover, upon the heat pump assembly 100 is the cooling mode heat pump assembly and upon $t_1 > t_2$, the controller 108 is configured to set the primary side outlet valve assembly 128 to fluidly connect the primary side outlet connection 128a and the primary side outlet valve first conduit connection 128b. Further, upon the heat pump assembly 100 is the cooling mode heat pump assembly and upon $t_1 > t_2$, the controller 108 is configured to set the primary side outlet valve assembly 128 to fluidly disconnect the primary side outlet connection 128a and the primary side outlet valve second conduit connection 128c.

Upon the heat pump assembly 100 is the cooling mode heat pump assembly and upon $t_2 > t_1$, the controller 108 is configured to set the primary side inlet valve assembly 126 to fluidly connect the primary side inlet valve first conduit connection 126b and the primary side inlet connection 126a. Further, upon the heat pump assembly 100 is the cooling mode heat pump assembly and upon $t_2 > t_1$, the controller 108 is configured to set the primary side inlet valve assembly 126 to fluidly disconnect the primary side inlet valve second conduit connection 126c and the primary side inlet connection 126a.

Moreover, upon the heat pump assembly 100 is the cooling mode heat pump assembly and upon $t_2 > t_1$, the controller 108 is configured to set the primary side outlet valve assembly 128 to fluidly connect the primary side outlet connection 128a and the primary side outlet valve second conduit connection 128c. Further, upon the heat pump assembly 100 is the cooling mode heat pump assembly and upon $t_2 > t_1$, the controller 108 is configured to set the primary side outlet valve assembly 128 to fluidly disconnect the primary side outlet connection 128a and the primary side outlet valve first conduit connection 128b.

Reversible Heat Pump Assembly

Figure 4:
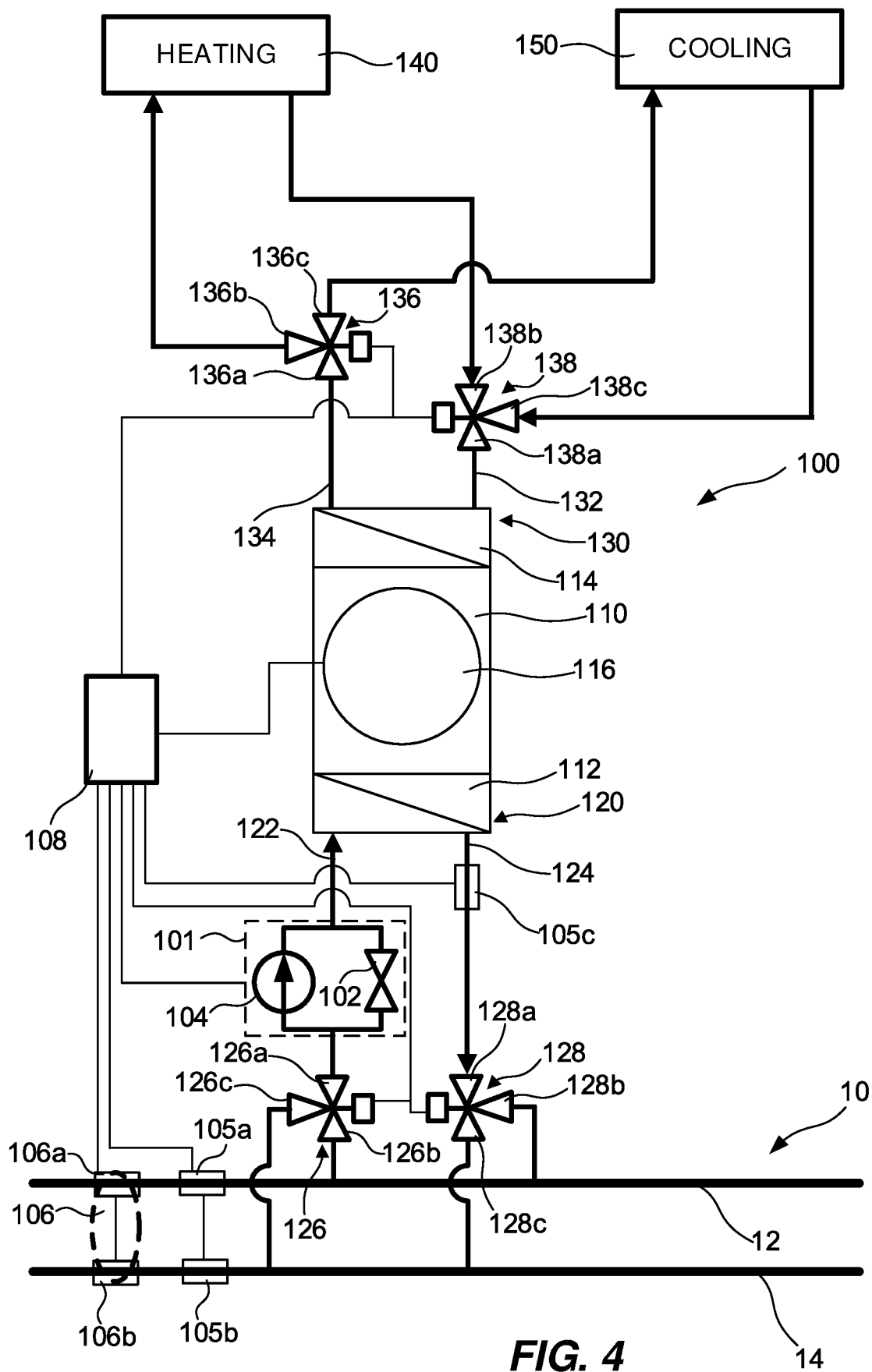
FIG. 4 is a schematic diagram of a reversible heat pump assembly connected to a thermal energy grid, to a heating circuit, and to a cooling circuit.

With reference to FIG. 4 the reversible heat pump assembly 100 will now be discussed. The reversible heat pump assembly 100 comprises similar components as the heating mode heat pump assembly 100 discussed in connection with FIG. 2 and the heating mode heat pump assembly 100 discussed in connection with FIG. 3. Hence, the reversible heat pump assembly 100 comprises a heat pump 110, a primary side inlet valve assembly 126, a primary side outlet valve assembly 128, a first conduit temperature determining device 105a, a second conduit temperature determining device 105b, and a controller 108. In order to avoid undue repetition, reference is made to the above for the structural features of the heat pump 110, the primary side inlet valve assembly 126, the primary side outlet valve assembly 128, the first conduit temperature determining device 105a, the second conduit temperature determining device 105b, and the controller 108 of the reversible heat pump assembly 100. However, some of the components of the reversible heat pump assembly 100 is configured to work differently than the same component of the heating mode heat pump assembly 100 and the cooling mode heat pump assembly 100. This will now be discussed.

The reversible heat pump assembly 100 is configured to be selectively set in either a heating mode or a cooling mode. Hence, the reversible heat pump assembly 100 may either be set up as the heating mode heat pump assembly 100 discussed above in connection with FIG. 2 or be set up as the cooling mode heat pump assembly 100 discussed above in connection with FIG. 3. At a specific point in time the reversible heat pump assembly 100 may be set to functions as either the heating mode heat pump assembly 100 or the cooling mode heat pump assembly 100. The reversible heat pump assembly 100 is configured to be set as the heating mode heat pump assembly 100 or the cooling mode heat pump assembly 100 by controlling the heat pump 110 of the reversible heat pump assembly 100. Upon the reversible heat pump assembly 100 is set in the heating mode, the heat pump 110 is configured to transfer heat from the primary side 120 to the secondary side 130. Upon the reversible heat pump assembly 100 is set in the cooling mode, the heat pump 110 is configured to transfer heat from the secondary side 130 to the primary side 120. Hence, the heat pump 110 is configured to transfer heat from the primary side 120 to the secondary side 130 or vice versa. Such a heat pump 110 may be referred to as a reversible heat pump. The reversible heat pump comprises the primary side coil 112, the secondary side coil 114 and a reversing valve 116.

Upon the reversible heat pump 110 is set in the heating mode the primary side coil 112 is configured to work as an evaporator, the secondary side coil 114 is configured to work as a condenser, and the reversing valve 116 is set such that refrigerant of the heat pump 110 is flowing from the primary side coil 112 to the secondary side coil 114. Hence, the refrigerant flowing from the primary side coil 112 (acting as an evaporator) carries thermal energy from thermal energy grid 10 to the secondary side 130 of the heat pump 110. Vapor temperature is augmented within the heat pump 110 by compressing it. The secondary side coil 114 (acting as a condenser) then transfers thermal energy (including energy from the compression) to the secondary side outlet 134 of the heat pump 110. The transferred heat will heat heat transfer liquid of the heating circuit 140. The refrigerant is then allowed to expand, and hence cool, and absorb heat from the thermal energy grid 10 in the primary side coil 112 (acting as an evaporator), and the cycle repeats.

Upon the reversible heat pump 110 is set in the cooling mode the secondary side coil 114 is configured to work as an evaporator, the primary side coil 112 is configured to work as a condenser, and the reversing valve 116 is set such that refrigerant of the heat pump 110 is flowing from the secondary side coil 114 to the primary side coil 112. Hence, upon the heat pump assembly 100 is set in the cooling mode the cycle is similar to what was discussed above in connection with the heat pump assembly 100 is set in the heating mode, but the primary side coil 112 is now the condenser and the secondary side coil 114 is the evaporator.

The controller 108 of the reversible heat pump assembly 100 is configured to set the reversible heat pump 110 of the reversible heat pump assembly 100 in the heating mode or in the cooling mode. The controller 108 may hence be configured to send a control signal to the reversible heat pump 110 indicating to the reversible heat pump 110 to be set in either the heating mode or in the cooling mode. The controller 108 may be configured to set the reversible heat pump 110 in the heating mode or in the cooling mode based on one or more demand signals indicative of what heating and/or cooling demands are needed in the building 5 wherein the reversible heat pump assembly 100 is installed. Hence, the controller 108 may be configured to receive one or more demand signals from heating and cooling systems of the building 5 wherein the reversible heat pump assembly 100 is installed. Each heating system of the building 5 comprises one or more heating circuits 140 connected to the heat pump assembly 100. Each cooling system of the building 5 comprises one or more cooling circuits 150 connected to the reversible heat pump assembly 100. The controller 108 may be configured to prioritize the demands from the different heating and cooling systems differently. For example, the controller 108 may be configured to prioritize a hot water production system higher than a comfort heating system or a cooling system. The controller 108 may be configured to set which one of a plurality of heating circuits 140 to be provided with heating from the reversible heat pump assembly 100. The controller 108 may be configured to set which one of a plurality of cooling circuits 150 to be provided with cooling from the reversible heat pump assembly 100.

The controller 108 of the of the reversible heat pump assembly 100 is further configured to control the primary side inlet valve assembly 126 and the primary side outlet valve assembly 128 of the reversible heat pump assembly 100. Upon the reversible heat pump assembly 100 is set in the heating mode, the controller 108 is configured to control the primary side inlet valve assembly 126 and/or the primary side outlet valve assembly 128 as discussed above in connection with the heating mode heat pump assembly 100 [FIG. 2]. Upon the reversible heat pump assembly 100 is set in the cooling mode, the controller 108 is configured to control the primary side inlet valve assembly 126 and/or the primary side outlet valve assembly 128 as discussed above in connection with the cooling mode heat pump assembly 100 [FIG. 3].

The reversible heat pump assembly 100 may further comprise a secondary side outlet valve assembly 136. The secondary side outlet valve assembly 136 comprises a heat pump connection 136a connected to the secondary side outlet 134, a heating circuit connection 136b configured to be connected to a heating circuit 140, and a cooling circuit connection 136c configured to be connected to a cooling circuit 150. All the connections 136a-c of the secondary side outlet valve assembly 136 are configured to fluidly connect the secondary side outlet valve assembly 136 to the respective device/circuit. Any such connection may be made using piping. Hence, the heat pump connection 136a is configured to fluidly connect the secondary side outlet valve assembly 136 with the secondary side outlet 134 of the reversible heat pump 110. The heating circuit connection 136b is configured to fluidly connect the secondary side outlet valve assembly 136 with the heating circuit 140. The cooling circuit connection 136c is configured to fluidly connect the secondary side outlet valve assembly 136 with the cooling circuit 150.

Upon the reversible heat pump assembly 100 is set in the heating mode, the secondary side outlet valve assembly 136 is configured to fluidly connect the heat pump connection 136a and the heating circuit connection 136b. Upon the reversible heat pump assembly 100 is set in the heating mode, the second side outlet valve assembly 136 may be configured to fluidly disconnect the heat pump connection 136a from the cooling circuit connection 136c. The secondary side outlet valve assembly 136 may be controlled by the controller 108.

The reversible heat pump assembly 100 may further comprise a secondary side inlet valve assembly 138. The secondary side inlet valve assembly 138 comprises a heat pump connection 138a connected to the secondary side inlet 132, a heating circuit connection 138b arranged to be connected to the heating circuit 140 and a cooling circuit connection 138c arranged to be connected to the cooling circuit 150. All the connections 138a-c of the secondary side inlet valve assembly 138 are configured to fluidly connect the secondary side inlet valve assembly 138 to the respective device/circuit. Any such connection may be made using piping. Hence, the heat pump connection 138a is configured to fluidly connect the secondary side inlet valve assembly 138 with the secondary side inlet 132 of the reversible heat pump 110. The heating circuit connection 138b is configured to fluidly connect the secondary side inlet valve assembly 138 with the heating circuit 140. The cooling circuit connection 138c is configured to fluidly connect the secondary side inlet valve assembly 138 and the cooling circuit 150. The secondary side inlet valve assembly 138 may be controlled by the controller 108.

Upon the reversible heat pump assembly 100 is set in the heating mode, the secondary side inlet valve assembly 138 is configured to fluidly connect the heat pump connection 138a with the heating circuit connection 138b. Upon the reversible heat pump assembly 100 is set in the heating mode, the secondary side inlet valve assembly 138 may be configured to fluidly disconnect the heat pump connection 138a from the cooling circuit connection 136c. Upon the reversible heat pump assembly 100 is set in the cooling mode, the secondary side inlet valve assembly 138 is configured to fluidly connect the heat pump connection 138a and the cooling circuit connection 138c. Upon the reversible heat pump assembly 100 is set in the cooling mode, the secondary side inlet valve assembly 138 may be configured to fluidly disconnect the heat pump connection 138a from the heating circuit connection 138b.

Method for Controlling the Primary Side Inlet Valve Assembly

Figure 5:
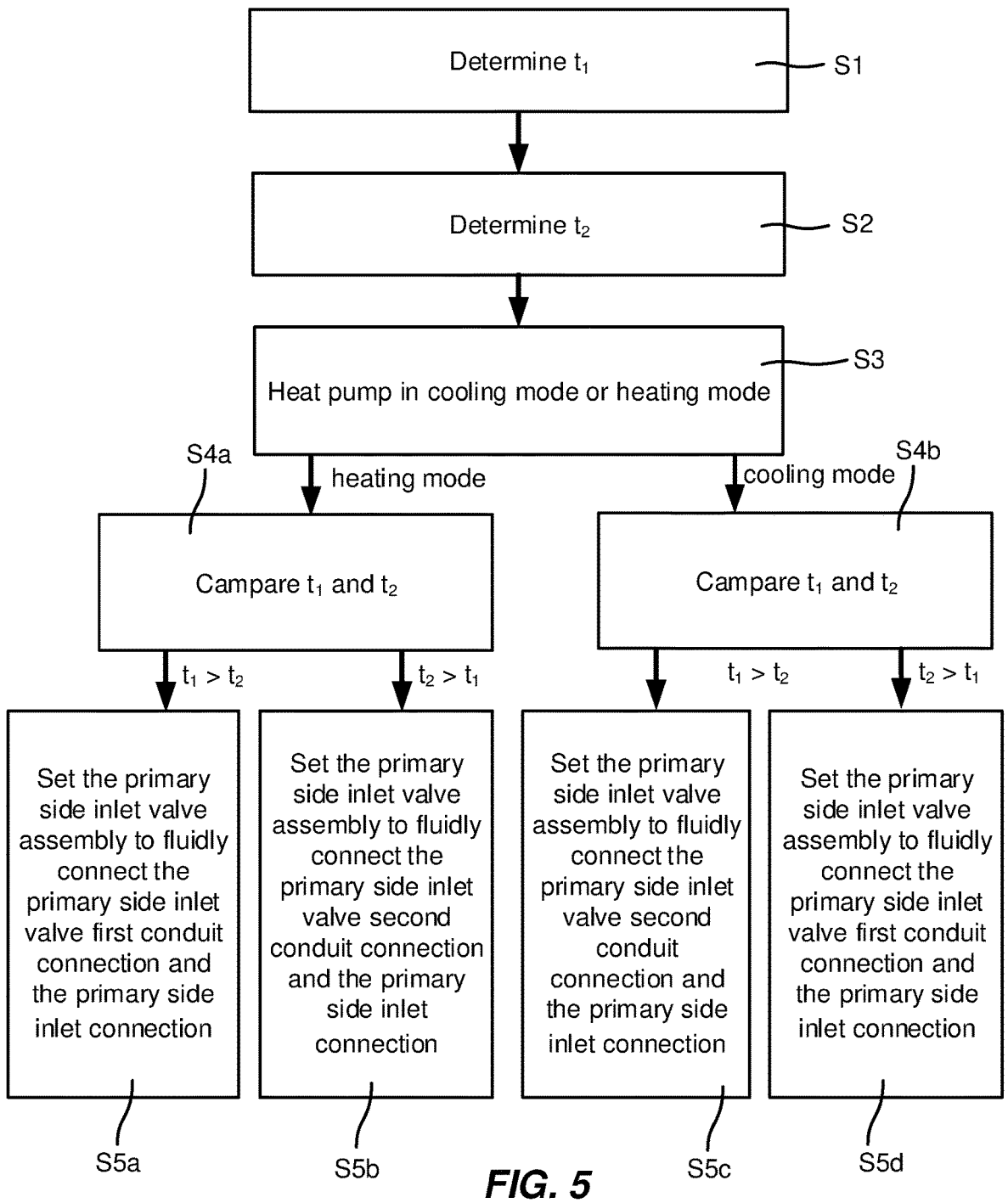
FIG. 5 is a flow chart of a method for controlling a primary side inlet valve assembly of a heat pump assembly.

FIG. 5 illustrates a flowchart of a method for controlling the primary side inlet valve assembly 126 of a heat pump assembly 100 connected to the thermal energy grid 10. The acts of the method may be performed by the controller 108 described above. However, it is equally realized that some or all of the act of the method may be performed by other devices. The method comprising the following acts. Determining S1 a local temperature, $t_1$, of heat transfer liquid of the first conduit 12. Determining S2 a local temperature, $t_2$, of heat transfer liquid of the second conduit 14. Receiving S3 information pertaining to whether the heat pump 110 is a heating mode heat pump or a cooling mode heat pump. Comparing S4a, S4b $t_1$ and $t_2$. Upon the heat pump 110 is the heating mode heat pump and upon $t_1 > t_2$, setting S5a the primary side inlet valve assembly 126 to fluidly connect the primary side inlet valve first conduit connection 126b and the primary side inlet connection 126a. Upon the heat pump 110 is the heating mode heat pump and upon $t_2 > t_1$, setting S5b the primary side inlet valve assembly 126 to fluidly connect the primary side inlet valve second conduit connection 126c and the primary side inlet connection 126a. Upon the heat pump 110 is the cooling mode heat pump and upon $t_1 > t_2$, setting S5c the primary side inlet valve assembly 126 to fluidly connect the primary side inlet valve second conduit connection 126c and the primary side inlet connection 126a. Upon the heat pump 110 is the cooling mode heat pump and upon $t_2 > t_1$, setting S5d the primary side inlet valve assembly 126 to fluidly connect the primary side inlet valve first conduit connection 126b and the primary side inlet connection 126a.

Additional Features of the Heat Pump Assembly

Below additional features of a specific heat pump assembly 100 of any of the kinds discussed in connection with FIGS. 2-4 will be discussed. A specific heat pump assembly 100 may comprise one or more of the additional features discussed below.

Pressure Difference Determining Device

A specific heat pump assembly 100 may further comprise a pressure difference determining device 106. The pressure difference determining device 106 is configured to determine a local pressure difference, $\Delta p$, between heat transfer liquid of the first and second conduits 12; 14 of the thermal energy grid 10. Δp is preferably measured in the vicinity to where the heat pump assembly 100 is connected to the thermal energy grid 10. The pressure difference determining device 106 may comprises a first conduit pressure determining device 106a and a second conduit pressure determining device 106b. The first conduit pressure determining device 106a is configured to be connected to the first conduit 12 for measuring a local pressure, $p_1$, of heat transfer liquid of the first conduit 12. The second conduit pressure determining device 106b is configured to be connected to the second conduit 14 for measuring a local pressure, $p_2$, of heat transfer liquid of the second conduit 14. The pressure difference determining device 106 is configured to determine Δp as a pressure difference between the local pressure of heat transfer liquid of the first conduit 12 and the local pressure of heat transfer liquid of the second conduit 14.

The pressure difference determining device 106 may be implemented as a hardware device, a software device, or as a combination thereof. The pressure difference determining device 106 is arranged to generate a local pressure difference signal indicative of the local pressure difference, Δp. The pressure difference determining device 106 may be configured to send the local pressure difference signal to the controller 108.

Flow Controller

A specific heat pump assembly 100 may further comprise a flow controller 101. The flow controller 101 is configured to control the flow of heat transfer fluid from the thermal energy grid 10 to the heat pump 110. Hence, the flow controller 101 is connected in between the thermal energy grid 10 and the heat pump 110. The flow controller 101 may be connected in between the primary side inlet valve assembly 126 and the primary side inlet 122. This is preferred since only one flow controller 101 is needed. Hence, the heat pump 110 is connected to the thermal energy grid 10 via the flow controller 101. The flow controller 101 is selectively set in a pumping mode or in a flowing mode. The flow controller 101 is selectively set in the pumping mode or in the flowing mode based on a heat pump assembly local delivery differential pressure, $\Delta p_{dp}$, according to the following:

$$\Delta p_{dp} = \Delta p + \Delta p_{che}$$

wherein $\Delta p_{che}$ is a differential pressure for overcoming the pressure drop over the heat pump 110 and possible also the primary side inlet valve assembly 126 and/or the primary side outlet valve assembly 128. The controller 108 may be configured to set the flow controller 101 in the pumping mode or in a flowing mode. Embodiments of a flow controller 101 may e.g. be found in PCT/EP2017/083077 by the same applicant.

Upon set in the pumping mode the flow controller 101 is configured to act as a pump 104 for pumping heat transfer liquid from the thermal energy grid 10 into the heat pump 110. Hence, upon the flow controller 101 being set in the pumping mode, heat transfer liquid from the thermal energy grid 10 is pumped into the heat pump 110. Upon set in flowing mode the flow controller 101 is configured to act as a flow regulator 102 for allowing heat transfer liquid from the thermal energy grid 10 to flow into the heat pump 110. The flow regulator 102 may be seen as a valve. Hence, upon the flow controller 101 being set in the flowing mode, heat transfer liquid from the thermal energy grid 10 is allowed to flow into the heat pump 110. Again, the choice of allowing heat transfer liquid from the thermal energy grid 10 to flow into the heat pump 110 or pumping heat transfer liquid from the thermal energy grid 10 into the heat pump 110, is made based on the heat pump assembly local delivery differential pressure, $\Delta p_{dp}$.

The controller 108 is configured to selectively set the flow controller 101 in the pumping mode or in the flowing mode. In the pumping mode the flow controller 101 is acting as a pump 104. In the flowing mode the flow controller 101 is acting as a flow regulator 102. Hence, the flow controller 101 is configured to selectively act as a pump 104 or as a flow regulator 102. The flow controller 101 is configured to, upon acting as a pump 104, pump heat transfer liquid through the flow controller 101. The flow controller 101 is configured to, upon acting as a flow regulator 102, allow heat transfer liquid to flow through the flow controller 101.

In the thermal energy grid 10 a differential pressure between heat transfer liquid in first and second conduits 12, 14 may change over time. More precisely, the differential pressure between heat transfer liquid of the first and second conduits 12, 14 may change such that the differential pressure changes from positive to negative or vice versa. Depending on the variating differential pressure between the first and second conduits 12, 14 of the thermal energy grid 10 and depending on if the heat pump assembly 100 is set in the heating mode or in the cooling mode sometimes heat transfer liquid of the thermal energy grid 10 need to be pumped through the heat pump assembly 100 and sometimes heat transfer liquid of the thermal energy grid 10 need to be allowed to flow through the heat pump assembly 100.

The controller 108 may also be configured to control the flow rate of heat transfer liquid through the flow controller 101. Accordingly, the controller 108 may also be configured to control the pump 104 of the flow controller 101 such that the flow rate of heat transfer liquid pumped by the pump 104 is controlled. Moreover, the controller 108 may also be configured to control the flow regulator 102 such that the flow rate of heat transfer liquid flowing through the flow controller 101 is controlled.

Outlet Temperature Determining Device

A specific heat pump assembly 100 may further comprise an outlet temperature determining device 105c. The outlet temperature determining device 105c is arranged to be connected to a return conduit connecting the primary side outlet 124 of the heat pump 110 and the primary side outlet valve assembly 128. The outlet temperature determining device 105c is arranged to measure an outlet temperature, $t_{return}$, of heat transfer liquid exiting the primary side outlet 124 of the heat pump 110 and being returned to the thermal energy grid 10. The outlet temperature determining device 105c may be connected to the controller 108 for communicating $t_{return}$ thereto.

The different temperatures $t_1$, $t_2$ and $t_{return}$ may be used for controlling the flow rate of heat transfer liquid of the thermal energy grid 10 through heat pump 110. The flow rate is preferably controlled such that $t_{return}$ equals the temperature of the heat transfer liquid of the conduit into which the heat transfer liquid is returned. Alternatively, or in combination, the flow rate of heat transfer liquid of the thermal energy grid 10 through heat pump 110 may be controlled such that the heat pump 110 inhale or exhale heat at a defined temperature difference. A temperature difference of 8-10° C. corresponds to optimal flows through the heat pump 110. The flow rate of heat transfer liquid of the thermal energy grid 10 through heat pump 110 may be controlled by the controller 108 by controlling the flow rate through the flow controller 101.

The person skilled in the art realizes that the present invention by no means is limited to the preferred embodiments described above. On the contrary, many modifications and variations are possible within the scope of the appended claims.

For example, in the above discussed embodiments the controller 108 is discussed as being implemented as a single device. However, the functions of the controller 108 may be distributed on different physical devices. For example, one device may be configured to control the setting of the reversible heat pump 110 in either the heating mode or the cooling mode, another device may be configured to control if the flow controller 101 shall be set in the flowing mode or in the pumping mode, and yet another device may be configured to control one or more of the different valve assemblies 126, 128, 136, 138. These different devices may be configured to communicate with each other.

Additionally, variations to the disclosed embodiments can be understood and effected by the skilled person in practicing the claimed invention, from a study of the drawings, the disclosure, and the appended claims.

The invention claimed is:

1. A heat pump assembly comprising:
a heat pump having a primary side inlet and a primary side outlet;
a primary side inlet valve assembly comprising:
a primary side inlet connection connected to the primary side inlet,
a primary side inlet valve first conduit connection configured to be connected to a first conduit of a thermal energy grid, and
a primary side inlet valve second conduit connection configured to be connected to a second conduit of the thermal energy grid;
a first conduit temperature determining device configured to measure a local temperature, $t_1$, of heat transfer liquid of the first conduit;
a second conduit temperature determining device configured to measure a local temperature, $t_2$, of heat transfer liquid of the second conduit; and
a controller configured to:
receive $t_1$ and $t_2$ from the first and second conduit temperature determining devices,
receive information pertaining to whether the heat pump is a heating mode heat pump or a cooling mode heat pump,
upon the heat pump is the heating mode heat pump:
upon $t_1 > t_2$, set the primary side inlet valve assembly to fluidly connect the primary side inlet valve first conduit connection and the primary side inlet connection,
upon $t_2 > t_1$, set the primary side inlet valve assembly to fluidly connect the primary side inlet valve second conduit connection and the primary side inlet connection,
upon the heat pump is the cooling mode heat pump:
upon $t_1 > t_2$, set the primary side inlet valve assembly to fluidly connect the primary side inlet valve second conduit connection and the primary side inlet connection,
upon $t_2 > t_1$, set the primary side inlet valve assembly to fluidly connect the primary side inlet valve first conduit connection and the primary side inlet connection.

2. The heat pump assembly according to claim 1, wherein the controller is further configured to:
upon the heat pump is the heating mode heat pump:
upon $t_1 > t_2$, set the primary side inlet valve assembly to fluidly disconnect the primary side inlet valve second conduit connection and the primary side inlet connection,
upon $t_2 > t_1$, set the primary side inlet valve assembly to fluidly disconnect the primary side inlet valve first conduit connection and the primary side inlet connection, upon the heat pump is the cooling mode heat pump:
upon $t_1 > t_2$, set the primary side inlet valve assembly to fluidly disconnect the primary side inlet valve first conduit connection and the primary side inlet connection,
upon $t_2 > t_1$, set the primary side inlet valve assembly to fluidly disconnect the primary side inlet valve second conduit connection and the primary side inlet connection.

3. The heat pump assembly according to claim 1, further comprising a primary side outlet valve assembly comprising:
a primary side outlet connection connected to the primary side outlet,
a primary side outlet valve first conduit connection configured to be connected to the first conduit of the thermal energy grid, and
a primary side outlet valve second conduit connection configured to be connected to the second conduit of the thermal energy grid;
wherein the controller is further configured to:
upon the heat pump is the heating mode heat pump:
upon $t_1 > t_2$, set the primary side outlet valve assembly to fluidly connect the primary side outlet connection and the primary side outlet valve second conduit connection,
upon $t_2 > t_1$, set the primary side outlet valve assembly to fluidly connect the primary side outlet connection and the primary side outlet valve first conduit connection,
upon the heat pump is the cooling mode heat pump:
upon $t_1 > t_2$, set the primary side outlet valve assembly to fluidly connect the primary side outlet connection and the primary side outlet valve first conduit connection,
upon $t_2 > t_1$, set the primary side outlet valve assembly to fluidly connect the primary side outlet connection and the primary side outlet valve second conduit connection.

4. The heat pump assembly according to claim 3, wherein the controller is further configured to:
upon the heat pump is the heating mode heat pump:
upon $t_1 > t_2$, set the primary side outlet valve assembly to fluidly disconnect the primary side outlet connection and the primary side outlet valve first conduit connection,
upon $t_2 > t_1$, set the primary side outlet valve assembly to fluidly disconnect the primary side outlet connection and the primary side outlet valve second conduit connection, upon the heat pump is the cooling mode heat pump:
upon $t_1 > t_2$, set the primary side outlet valve assembly to fluidly disconnect the primary side outlet connection and the primary side outlet valve second conduit connection,
upon $t_2 > t_1$, set the primary side outlet valve assembly to fluidly disconnect the primary side outlet connection and the primary side outlet valve first conduit connection.

5. The heat pump assembly according to claim 1, wherein the heat pump is a reversible heat pump having a primary side and a secondary side, the primary side having the primary side inlet and the primary side outlet allowing at least one of the heat transfer liquid of the first conduit or the heat transfer liquid of the second conduit to flow through the primary side of the reversible heat pump, the secondary side having a secondary side inlet and a secondary side outlet allowing second heat transfer liquid to flow through the secondary side of the reversible heat pump, the reversible heat pump being configured to be selectively set in either a heating mode wherein the heat pump is configured to transfer heat from the primary side to the secondary side acting as the heating mode heat pump, or in a cooling mode wherein the heat pump is configured to transfer heat from the secondary side to the primary side acting as the cooling mode heat pump.

6. The heat pump assembly according to claim 5, further comprising:
    a secondary side outlet valve assembly comprising:
        a secondary side outlet connection connected to the secondary side outlet;
        a heating circuit connection configured to be connected to a heating circuit being configured to allow the second heat transfer liquid to flow therethrough; and
        a cooling circuit connection configured to be connected to a cooling circuit being configured to allow the second heat transfer liquid to flow therethrough;
    wherein the controller is further configured to:
        selectively set the reversible heat pump in either the heating mode or in the cooling mode,
        upon the heat pump is set in the heating mode, set the secondary side outlet valve assembly to fluidly connect the secondary side outlet connection and the heating circuit connection, and
        upon the heat pump is set in the cooling mode, set the secondary side outlet valve assembly to fluidly connect the secondary side outlet connection and the cooling circuit connection.

7. The heat pump assembly according to claim 6, wherein the controller is further configured to:
    upon the heat pump is set in the heating mode, set the secondary side outlet valve assembly to fluidly disconnect the secondary side outlet connection and the cooling circuit connection,
    upon the heat pump is set in the cooling mode, set the secondary side outlet valve assembly to fluidly disconnect the secondary side outlet connection and the heating circuit connection.

8. The heat pump assembly according to claim 6, wherein the reversible heat pump comprises a primary side coil, a secondary side coil and a reversing valve,
    wherein upon the heat pump is set in the heating mode:
    the primary side coil is configured to work as an evaporator,
    the secondary side coil is configured to work as a condenser, and
    the reversing valve is set such that refrigerant of the heat pump is flowing from the primary side coil to the secondary side coil; and
    wherein upon the heat pump assembly is set in the cooling mode:
    the secondary side coil is configured to work as an evaporator,
    the primary side coil is configured to work as a condenser, and
    the reversing valve is set such that refrigerant of the heat pump is flowing from the secondary side coil to the primary side coil.

9. The heat pump assembly according to claim 1, further comprising:
    a pressure difference determining device configured to determine a local pressure difference between the heat transfer liquid of the first and the second conduits; and
    a flow controller connected in between the primary side inlet of the heat pump and the primary side inlet valve assembly, wherein the flow controller is configured to be selectively set in either a pumping mode or in a flowing mode, wherein upon set in the pumping mode the flow controller is configured to act as a pump for pumping the heat transfer liquid from at least one of the first conduit or the second conduit into the primary side inlet of the heat pump, and wherein upon set in flowing mode the flow controller is configured to act as a flow regulator for allowing the heat transfer liquid from at least one of the first conduit or the second conduit to flow into the primary side inlet of the heat pump; and
    wherein the controller is further configured to, based on the local pressure difference, selectively control the flow controller to be set in the pumping mode or in the flowing mode.

10. The heat pump assembly according to claim 1, further comprising:
    a pressure difference determining device adapted to determine a local pressure difference between the heat transfer liquid of the first and the second conduits;
    a flow regulator connected in between the primary side inlet of the heat pump and the primary side inlet valve assembly, wherein the flow regulator is configured to allow the heat transfer liquid from at least one of the first conduit or the second conduit to flow into the primary side inlet of the heat pump; and
    a pump connected in between the primary side inlet of the heat pump and the primary side inlet valve assembly, wherein the pump is configured to pump the heat transfer liquid from at least one of the first conduit or the second conduit into the primary side inlet of the heat pump;
    wherein the controller is further configured to, based on the local pressure difference, selectively activate either the flow regulator or the pump for transferring the heat transfer liquid from at least one of the first conduit or the second conduit into the primary side inlet of the heat pump.

11. The heat pump assembly according to claim 9, wherein the controller is further configured to base the setting of the flow controller in the pumping mode or the flowing mode on if the heat pump is the cooling mode heat pump or the heating mode heat pump.

12. A district thermal energy distribution system comprising:
    a thermal energy grid comprising:
    a first conduit configured to allow heat transfer liquid of a first temperature to flow therethrough, and
    a second conduit configured to allow heat transfer liquid of a second temperature to flow therethrough; and
    a heat pump assembly according to claim 1, wherein the heat pump assembly is connected to the thermal energy grid.

13. The district thermal energy distribution system according to claim 12, further comprising a plurality of heat pump assemblies according to claim 1, wherein each of the plurality of the heat pump assemblies is connected to the thermal energy grid.

14. A controller configured to control a primary side inlet valve assembly comprising a primary side inlet connection connected to a primary side inlet of a heat pump, a primary side inlet valve first conduit connection connected to a first conduit of a thermal energy grid, and a primary side inlet valve second conduit connection connected to a second conduit of the thermal energy grid;
    wherein the controller is configured to:
        receive a local temperature, $t_1$, of heat transfer liquid of the first conduit;
        receive a local temperature, $t_2$, of heat transfer liquid of the second conduit;
        receive information pertaining to whether the heat pump is a heating mode heat pump or a cooling mode heat pump;
        upon the heat pump is the heating mode heat pump:
        upon $t_1 > t_2$, set the primary side inlet valve assembly to fluidly connect the primary side inlet valve first conduit connection and the primary side inlet connection,
        upon $t_2 > t_1$, set the primary side inlet valve assembly to fluidly connect the primary side inlet valve second conduit connection and the primary side inlet connection,
        upon the heat pump is the cooling mode heat pump:
        upon $t_1 > t_2$, set the primary side inlet valve assembly to fluidly connect the primary side inlet valve second conduit connection and the primary side inlet connection,
        upon $t_2 > t_1$, set the primary side inlet valve assembly to fluidly connect the primary side inlet valve first conduit connection and the primary side inlet connection.

15. A method for controlling a primary side inlet valve assembly comprising a primary side inlet connection connected to a primary side inlet of a heat pump, a primary side inlet valve first conduit connection connected to a first conduit of a thermal energy grid, and a primary side inlet valve second conduit connection connected to a second conduit of the thermal energy grid; the method comprising:
    determining a local temperature, $t_1$, of heat transfer liquid of the first conduit;
    determining a local temperature, $t_2$, of heat transfer liquid of the second conduit;
    receiving information pertaining to whether the heat pump is a heating mode heat pump or a cooling mode heat pump; and
    comparing $t_1$ and $t_2$,
    wherein the method further comprises:
    upon the heat pump is the heating mode heat pump and upon $t_1 > t_2$, setting the primary side inlet valve assembly to fluidly connect the primary side inlet valve first conduit connection and the primary side inlet connection;
    upon the heat pump is the heating mode heat pump and upon $t_2 > t_1$, setting the primary side inlet valve assembly to fluidly connect the primary side inlet valve second conduit connection and the primary side inlet connection;
    upon the heat pump is the cooling mode heat pump and upon $t_1 > t_2$, setting the primary side inlet valve assembly to fluidly connect the primary side inlet valve second conduit connection and the primary side inlet connection; or
    upon the heat pump is the cooling mode heat pump and upon $t_2 > t_1$, setting the primary side inlet valve assembly to fluidly connect the primary side inlet valve first conduit connection and the primary side inlet connection.

\* \* \* \* \*